United States Patent Office 3,072,526
Patented Jan. 8, 1963

3,072,526
INSECT LURES
Adolf Butenandt, Munich-Obermenzing, Germany, Waldemar Guex, Bottmingen, Switzerland, Erich Hecker, Munich, Germany, and Rudolf Rüegg, Bottmingen, and Ulrich Schwieter, Basel, Switzerland, assignors to Hoffmann-La Roche Inc., Nutley, N.J., a corporation of New Jersey
No Drawing. Filed Feb. 10, 1960, Ser. No. 7,760
Claims priority, application Switzerland Feb. 16, 1959
2 Claims. (Cl. 167—48)

Most of the presently used agents employed in insecticides for the destruction of insects have serious disadvantages. The insecticides must either be sprayed directly onto the plants or animals to be protected, converted into a mist or spray enveloping them or be taken up by the plants themselves (the so-called systemic insecticides). These measures require expensive apparatus and frequent application so that new colonies of pests may be eradicated or newly developed parts of plants may be protected. In many instances the period during which the pests are on the plants, cultures or animals and cause the damage is very short so that they are not destroyed by insecticides taken in feeding or on contact.

Some insecticides such as arsenic, nicotine and O,O-diethyl-O-p-nitrophenyl thiophosphate preparations are not only very toxic for insects but also for humans and animals. They cannot be applied to fruits, vegetables or feedstuffs shortly before they are used and thus their applicability is limited. Other insecticides which are relatively harmless for humans and other warm blooded animals, for example DDT and lindane, have the disadvantages that they stain fruits and vegetables which are eaten uncooked and also, as a consequence of their broad activity, upset the biological balance in nature. The common insecticides, moreover, not only destroy the pests but also numerous useful insects, for example honey bees and natural enemies of the pests, for example Coccinella.

Besides this, numerous so-called pests attack cultures, wide areas such as forests, olive groves, etc., where the effectiveness of spraying is questionable and some methods of insect eradication are not even practical. Widespread spraying is primarily only directed against May beetles in temperate zones before they deposit their eggs and locust plague in arid areas.

It has been attempted to eliminate the disadvantages discussed above by introducing systemic insecticides which are much more specific in their activity than normal residual or contact insecticides, but they too have their limitations. Repellents have also been employed with good results under some circumstances. But these substances do not have a lasting effect and do not accomplish the ultimate purpose of widespread destruction of pests. Finally, it has also been attempted to use certain materials which attract insects, such as sugar solutions, ammonium sulfate and the like, or attracting devices such as light sources, high frequency sound devices, etc. These, like the conventional insecticides, are not specific and besides have only a very weak power of attraction so that their effectiveness is questionable.

The aforementioned disadvantages may be avoided if the attempt is not made to protect the plants, cultures or animals in the particular places where the harm occurs by means of protective coatings or fluids. A more effective approach is to attract the pests to a particular location where they may then be destroyed with efficient chemical or physical exterminators.

The purpose of this invention is to develop a specific insect lure by means of which harmful pests may be eradicated without injury to the humans, plants, cultures, or animals intended to be protected. The invention lies in the discovery that unbranched aliphatic alcohols containing a total of 14 to 18 carbon atoms, a terminal hydroxy group and two double bonds in the aliphatic chain, attract insects of various species. When used in combination with chemical or physical exterminators, preferably with chemical insecticides, they provide useful specific local insect eradicators. They may be prepared by synthetic methods and made use of for a wide variety of pests including, for example, spiders, mites, aphids, moths and the like. Physical types of exterminators include mechanical, electrical or thermal devices.

Especially useful are compounds wherein the double bonds are in a conjugated system so that the products may be represented by the formula (I)    A—CH=CH—CH=CH—B wherein A and B each represents an unbranched alkyl group, the terminal carbon atom of one of these alkyl groups bearing a hydroxyl radical which may be esterified. The total number of atoms in the alkyl chains represented by A and B together is 10 to 14. In other words the straight chain alcohol contains a total of 14 to 18 carbon atoms and two double bonds, in a conjugated system, in the molecule. Preferred are the alcohols wherein each of the groups represented by A and B contain at least 3 carbon atoms. Fourteen to 16 carbon atom alcohols and especially 16 carbon atom alcohols are most preferred.

The alcohols described above may be esterified by means of a lower aliphatic acid so that the terminal group, instead of being —$CH_2OH$, is —$CH_2OR$, wherein R represents a lower alkanoyl group.

Examples of compounds which may be used as insect lures according to this invention are 6,8-pentadecadien-1-ol, 10,12-hexadecadien-1-ol, 10,12-pentadecadien-1-ol, 6,8-tetradecadien-1-ol, 5,8-tetradecadien-1-ol, 10,13-hexadecadien-1-ol, 11,13-hexadecadien-1-ol, 9,12-hexadecadien-1-ol, 9,11-hexadecadien-1-ol, acetates and propionates thereof, etc.

The use of a relatively large variety of compounds within the group described is advantageous when as great as possible a destruction of insects is desired. If it is intended to destroy only a limited or definite group of insects, then only a single member or a few representative compounds of the group should be used. It has been found that the lures of the present invention exert primarily an attraction for the male of the species.

The insect attractants of this invention may be used per se for other purposes without the addition of a poison. They may serve to guide the inserts in the fertilization of flowers which is one desirable function which some of them perform. They may also be made use of in controlling the flight, in the issuing of warnings for the protection of flowers and in research on population dynamics.

Illustrative of the wide variety of chemical insecticides which may be used with the insect lures of this invention are the following: DDT, lindane, allethrin, chlordane, malathion, rotenone, etc.

The insect lures of this invention are quite potent and therefore are best diluted with inert ingredients, preferably dry materials, either admixed therewith or adsorbed thereon. They may be used with inert materials such as talc, kaolin, bentonite, sawdust or other diluents conventionally used in insecticides. The proportions are not critical and dilutions in the range of 100:1 to 500,000:1 may be used.

When the lures are used in combination with an insecticide, the proportions are not especially critical, but the fact must be taken into consideration that the lures are active in very great dilution. To a great extent it depends upon the activity of the insecticide or insecticides used in conjunction therewith. It has been found that, according to the activity of the components, the insecticide and lure may be used in a proportion of approximately 3:1 up to 10,000:1 (insecticide:lure). The conventional proportion of insecticide to carrier may be used in the finished preparation admixing in the usual manner with inert materials such as kieselguhr, talc, kaolin, bentonite, sawdust and the like.

For example, a mixture containing 0.75 g. of 10,12-hexadecadien-1-ol, 2 g. of λ-hexachlorocyclohexane (lindane) and 100 g. of kieselguhr spread uniformly over a surface of 10 sq. meters in a location not directly exposed to the sun's rays is especially useful for various species of spinning insects such as those of the family Bombycoidea. It is also possible, as another application, to utilize a mixture such as that just described, containing, however, 500 g. instead of 100 g. of kieselguhr, by distributing the mixture on a surface of 300 sq. meters in the immediate vicinity of cultures to be protected but not directly on them.

The alcohols and their esters which constitute the subject matter of this invention, may readily be produced by integrated synthetic methods by means of several routes. According to one procedure, an aldehyde of the general formula (II)  A′—(CH=CH)$_m$—CHO is reacted in an inert solvent with a phosphorane of the general formula (III)  (C$_6$H$_5$)$_3$P=CH—(CH=CH)$_n$—B′

The symbols A′ and B′ in Formulas II and III represent straight chain alkyl groups totalling together 9 to 13 carbon atoms. One of the terminal carbon atoms of either alkyl group must contain the desired hydroxymethylene group or esterified hydroxymethylene group or a functional group readily converted to such a substituent, e.g. a carboxy group or esterified carboxy group, an etherified hydroxymethylene group or an acetalized carbonyl group. In other words the terminal group is —CH$_2$OH, —CH$_2$OR$_1$

or —COOR$_3$ wherein R$_1$ represents lower alkanoyl or lower alkyl, R$_2$ represents lower alkyl and R$_3$ represents hydrogen or lower alkyl. One of the symbols $m$ and $n$ represents the integer 1 and the other represents 0. It is also possible for a triple bond to replace one of the double bonds in the starting materials. If a triple bond does replace one double bond, this triple bond may be selectively reduced to a double bond before or after the condensation of the aldehyde with the phosphorane. The terminal group, if not already an hydroxymethylene group or esterified hydroxymethylene group, may readily be converted to one of those groups after the condensation of the aldehyde with the phosphorane.

The product of the condensation is an addition complex which breaks down spontaneously upon standing for an extended period of time, e.g. about 8 to 24 hours, or more quickly upon heating into the long chain aliphatic compound and triphenylphosphine oxide. The latter, in most common solvents, precipitates out and may be readily separated.

The phosphoranes of the general Formula III may be obtained from the corresponding phosphonium halides by treatment with phenyl lithium, butyl lithium, sodium methoxide, aqueous sodium hydroxide or the like. The phosphonium halides are readily prepared from the corresponding halides by treatment with triphenylphosphine.

The condensation of a phosphorane of Formula III with the aldehyde of Formula II is best effected in a solvent such as ether, methylene chloride or hydrocarbons, for example benzene, and at a temperature between 0° and the boiling point of the solvent. It is advantageous to carry out the reaction in a nitrogen atmosphere. The selective hydrogenation of the triple bond may be carried out in the presence of a catalyst such as lead poisoned palladium catalyst [Helv. Chim. Acta 35, 446 (1952)].

A second method for obtaining the compounds of Formula I comprises reacting acetylene monolaterally with an aldehyde of the general formula (IV)  CH$_3$-alkylene-CHO to obtain an acetylene carbinol. The latter will react with an aldehyde of the general formula (V)  OHC-alkylene-X$_1$ in a metallo organic reaction to produce an acetylene glycol. Reduction of the acetylene glycol with a metal hydride selectively reduces the triple bond to a double bond and simultaneously converts the terminal group as well as effects dehydration so that the two hydroxy groups are removed leaving two double bonds in their place to join the respective carbon atoms.

The alkylene groups in Formulas IV and V are unbranched aliphatic hydrocarbon groups having a total of 8 to 12 carbon atoms. X$_1$ represents a terminal hydroxymethylene group, an esterified hydroxymethylene group or a group convertible to them as described above.

The metallo organic reaction in which the acetylene carbinol and aldehyde of Formula V participate may be a Grignard reaction. In this case the carbinol is converted to a Grignard complex and the conventional conditions are observed. Alternatively, the acetylene carbinol may be reacted with an alkali metal compound, preferably carrying out the reaction in liquid ammonia.

The reduction of the acetylene glycol is effected with a metal hydride, e.g. an alkali metal hydride such as lithium aluminum hydride, in an organic base. N,N-diethylaniline is a desirable base for use with lithium aluminum hydride.

The compounds of Formula I may also be produced by condensing a halide of the general formula (VI)  alkyl-C≡C—CH$_2$-hal with a straight chain aliphatic aldehyde of the general formula (VII)  OHC-alkylene-X$_1$ by means of a Grignard or Reformatsky reaction. Either route results in an acetylene carbinol which is then dehydrated. The acetylenic bond is selectively hydrogenated to a double bond.

In the above structural formulas the alkyl and alkylene groups are unbranched saturated aliphatic hydrocarbon radicals which together total 9–13 carbon atoms. X$_1$ represents a hydroxymethylene group, an esterified hydroxymethylene group or a functional group which may be readily converted to those groups, e.g. a carboxyl group, an esterified carboxyl group, an acetalized carbonyl group, or an etherified hydroxymethylene group.

The conditions for effecting a Grignard or Reformatsky reaction are known. For the dehydration of the acetylene carbinol a dehydrating agent such as phosphorus oxychloride, phosphorus pentoxide or the like may be used. A selective hydrogenation catalyst such as a lead poisoned palladium catalyst is used for the reduction of the triple bond to a double bond. Reduction, e.g. with lithium aluminum hydride, sodium borohydride, sodium in amyl alcohol, and the like, will in general convert the other functional groups referred to above to the hydroxymethylene group which then may be esterified with an acid such as a lower fatty acid.

As an alternative to the above described method, it is possible to use starting materials wherein the functional groups appear on the opposite type of reactant, e.g.

(VIII)  alkyl-CHO and (IX)  hal-CH$_2$—C≡C-alkylene-X$_1$

But the same sequence of operations may be pursued.

Still another method for synthesizing the products of Formula I comprises converting an acetylene compound of the formula (X)     alkyl-CH=CH—C≡CH into its metal organic derivative, e.g. with an alkali metal compound such as sodium amide, then condensing that metal organic derivative with a halide of the formula (XI)     hal-alkylene-$X_1$ Selective hydrogenation of the triple bond and, if necessary, conversion of the functional group $X_1$ if other than hydroxymethylene, to the later group follow. As will be appreciated, the alkyl and alkylene groups and $X_1$ have the same significance as alread discussed. The conversion of the acetylene group into its metal organic derivative is preferably effected in liquid ammonia.

Here too, the functional groups may appear on the opposite class of reactant, i.e.

(XII)     HC≡C—CH=CH-alkylene-$X_1$ and (XIII)     alkyl-hal and the same sequence of reactions performed.

A modification of the above procedure involves the condensation of a propargyl halide derivative of the formula (XIV)     $CH_3$-alkylene-C≡C—$CH_2$-hal with a Grignard derivative or alkali metal derivative of the type described above of another acetylenic compound of the formula (XV)     HC≡C-alkylene-$X_1$ to obtain a diacetylenic product of the formula (XVI)   $CH_3$-alkylene-C≡C—$CH_2$—
                              C≡C-alkylene-$X_1$ When the Grignard derivative is used, it is preferably formed in the presence of cupric chloride. The two triple bonds are then selectively hydrogenated to double bonds by the same means as described above and then the double bonds are converted to a conjugated system by isomerization, e.g. by means of a strong alkali such as potassium hydroxide, preferably at an elevated temperature, for example in the range of about 90 to 180° C., and in an anhydrous solvent, especially mono- or polyhydroxy compounds such as butanol, ethylene glycol, glycerine and the like. Isomerization by means of an alkali metal compound such as sodium- or potassium amide in liquid ammonia at a temperature in the range of about −30 to +20° C. may also be employed.

In the above formulas, the alkylene groups total 7 to 11 carbon atoms to obtain the desired 14 to 18 carbon atom unbranched aliphatic compounds. $X_1$ again represents the same functional groups as above and the same remarks apply.

The isomerization may result in an isomer having the formula (XVII)
  $CH_3$-alkylene-$CH_2$—CH=CH—CH=CH-alkylene-$X_1$ or one having the formula (XVIII)
  $CH_3$-alkylene-CH=CH—CH=CH—$CH_2$-alkylene-$X_1$ or a mixture of the two isomers. Separation of the isomers from a mixture thereof may be effected by fractional crystallization or by chromatographing on activated alumina. The products can also display cis and trans configuration about the double bonds. It is to be understood that all forms are within the scope of the invention.

The examples which follow serve to illustrate the invention. Temperatures are on the centigrade scale.

*Example 1*

A mixture of 118 g. of hexamethylene glycol, 15 g. of cuprous bromide and 700 ml. of 40% hydrobromic acid was heated at 95–100° and extracted successively over a period of 24 hours with ligroin (boiling range 105–120°). The ligroin extracts were shaken with potassium carbonate, filtered and the 6-bromo-1-hexanol, after removal of the solvent, was distilled in vacuo in a short Vigreux column, B.P. 120°/12 mm.

To a solution of 185 g. of triphenylphosphine in 500 ml. of benzene were added the 6-bromo-1-hexanol obtained above dissolved in 300 ml. of benzene and heated to boiling for 8 hours. The reaction mixture was then cooled to 10°, left at this temperature for 2 hours and then decanted from the precipitate. The latter was then washed twice with benzene and dried in vacuo at 40°.

To a suspension of 120 g. of the (6-hydroxyhexyl)-triphenylphosphonium bromide obtained as described above in 500 ml. of absolute ether were added slowly with stirring in a nitrogen atmosphere at 0 to 5°, 265 ml. of a 1.15 N solution of phenyl lithium in absolute ether. The mixture was stirred for 2 hours at room temperature and then a solution of 35 g. of 2-nonenal in 200 ml. of absolute ether were added dropwise, while cooling with ice. Then the mixture was heated to boiling in a nitrogen atmosphere for 2 hours, cooled and filtered under suction from the precipitate which was washed several times with ether. After filtering again the filtrates were combined, washed neutral with water and dried over sodium sulfate. The solvent was distilled off in vacuo and the 6,8-pentadecadien-1-ol was distilled under high vacuum at 115–130° (U.V. absorption maximum at 233 mμ; active "H"=0.90; characteristic bands in the I.R. spectrum at 3.02, 6.07, 9.5, 10.22 and 10.59μ). The product obtained was purified by chromatographing on aluminium oxide.

A sample of the 6,8-pentadecadien-1-ol obtained above, upon hydrogenation in glacial acetic acid in the presence of platinum catalyst absorbed 2.1 mols of hydrogen and after working up in the conventional fashion yielded colorless crystals of 1-pentadecanol, M.P. 44–46°.

*Example 2*

Dry, acetone-free acetylene was introduced into a solution containing 17 g. of lithium in 2500 ml. of liquid ammonia until the solution became decolorized. Thereupon a solution containing 72 g. of n-butyraldehyde in 300 ml. of absolute ether were added dropwise over a period of 30 minutes and the mixture was then stirred for an additional 20 hours. After the careful addition of 85 g. of dry ammonium chloride, the ammonia was evaporated, 600 ml. of water were added and the mixture was extracted with ether. The ther extract was washed several times with water, dried over sodium sulfate and the solvent evaporated in vacuo at 25°. 1-hexyn-3-ol was obtained in the form of a yellow oil which could be used for the next step without further purification [active "H"=0.9 (cold), 2.1 (warm)].

The crude product obtained above was dissolved in 400 ml. of absolute ether and added dropwise with stirring to a Grignard solution prepared from 53.5 g. of magnesium and 175 ml. of ethyl bromide in 500 ml. of absolute ether. The mixture was heated to boiling for 2 hours in a nitrogen atmosphere. After cooling, a solution containing 200 g. of 9-oxononane-1-carboxylic acid methyl ester (M.P. 24–26°) in 1500 ml. of absolute ether was slowly added and the mixture was again heated to boiling for 4 hours with stirring. The reaction mixture was permitted to cool, poured into a mixture containing 1 liter of 3 N sulfuric acid and 1.5 liters of ice water, then extracted with ether. The ether extract was washed successively with 5% sodium bicarbonate solution and water and then dried over sodium sulfate. The solvent was then distilled off in vacuo at 25°. There was obtained 10,13-dihydroxy-11-hexadecayne-1-carboxylic acid methyl ester in the form of a dark yellow, viscous oil [active "H"=1.9 (cold); $n_D^{22}$=1.4630; characteristic bands in the I.R. spectrum at 3.01, 4.48, 5.76 and 8.03μ].

100 g. of the crude 10,13-dihydroxy-11-hexadecayne-1-carboxylic acid methyl ester obtained above were admixed with 2.5 liters of N,N-diethylaniline. While stirring vigorously at 0 to 5°, a solution containing 52 g. of lithium aluminum hydride in 950 ml. of absolute ether were added and the mixture was heated in a nitrogen atmosphere for 5 hours at 60°. Then while cooling with ice, 250 ml. of ethyl acetate were added dropwise at 5°. The reaction mixture was poured into a mixture of 3 N sulfuric acid and ice then extracted with ether. The ether extract was washed successively several times with 1 N sulfuric acid, 5% sodium bicarbonate solution and water. Then it was dried over sodium sulfate and the solvent was removed at 40° in vacuo. The crude 10,12-hexadecadien-1-ol thus obtained was distilled at 140–160° under high vacuum to obtain a colorless oil with U.V. absorption maximum at 233 mμ, active "H"=0.95/mol and characteristic bands in the I.R. spectrum at 3.0, 6.09, 9.55, 10.21 and 10.56μ. The product obtained was further purified by chromatographing on aluminum oxide.

A sample of the product obtained above upon hydrogenation in glacial acetic acid in the presence of platinum catalyst absorbed 2 molar proportions of hydrogen and yielded after working up according to the usual methods cetyl alcohol of M.P. 48° (uncorr.).

*Example 3*

115 g. of the p-toluenesulfonic acid ester of 1-hexyn-4-ol were slowly added to a solution of 30 g. of potassium hydroxide and 100 ml. of water at 110° with stirring, whereupon a vigorous reaction ensued. The resulting 3-hexen-1-yne together with water distilled over and were collected in a cooled condenser. The upper layer was separated, dried over calcium chloride and subjected to distillation to obtain colorless 3-hexen-1-yne, B.P. 58–62°/300 mm., U.V. maximum at 223 mμ.

80 g. of 3-hexen-1-yne were added dropwise to a suspension of 48 g. of sodium amide in 500 ml. of liquid ammonia. After a short time, 271 g. of the pyranyl ether of 9-bromononyl alcohol were added. The mixture was stirred for 24 hours at the boiling temperature of the ammonia. 60 g. of ammonium chloride were slowly added and the ammonia was permitted to evaporate off. The residue was mixed with ether and the ether solution was washed with water. After drying and evaporating the ether, the residue obtained was boiled under reflux with 500 ml. of methanol and 0.5 g. of p-toluenesulfonic acid for 2 hours. After cooling, the mixture was diluted with water, extracted with ether and the ether solution was washed with dilute sodium bicarbonate solution and water. After drying and concentrating, 160 g. crude 12-pentadecaen-10-yn-1-ol was obtained as a dark colored viscous oil which distilled under high vacuum at 130–150°; U.V. maximum at 228 mμ. The product was purified by chromatographing on aluminum oxide.

10 g. of 12-pentadecaen-10-yn-1-ol were agitated in 100 ml. of thiophene-free benzene with 1 g. of a lead poisoned palladium catalyst to which had been added 0.1 ml. of quinoline in a hydrogen atmosphere at room temperature until the absorption of hydrogen stopped. The catalyst was filtered off, the benzene solution was washed with dilute sulfuric acid and, after evaporating the benzene, 10-cis,12-pentadecadien-1-ol was obtained as a colorless viscous oil; U.V. maximum at 233 mμ. In the I.R. absorption spectrum, it displayed among others typical bands at 9.5–9.85μ for an α,β-saturated primary alcohol and at 10.19 and 10.56μ for a conjugated cis-trans diene. The product gave upon hydrogenation with platinum in alcohol with absorption of 2 mols of hydrogen 1-pentadecanol, M.P. 45°.

*Example 4*

70 g. of granulated zinc were activated by warming with a little iodine and after cooling treated with 0.5 g. of mercuric chloride. A mixture of 161 g. of 1-bromo-2-hexyne, 214 g. of 10-acetoxydecanal and 400 ml. of absolute ether was added dropwise at such a rate that the mixture boiled continuously at a very slow rate. At the conclusion of the reaction, the mixture was boiled under reflux for an additional ½ hour. It was then poured into a mixture of ice and dilute sulfuric acid. The ether solution was washed with dilute sodium bicarbonate solution and water. After drying with sodium sulfate and evaporating the ether, the residue was purified by molecular distillation. 1-acetoxy-12-hexadecayne-10-ol was obtained as a colorless oil; active "H"=0.95. The product showed in the I.R. absorption spectrum, among others, bands at 4.5μ for the triple bond, at 9μ for the secondary alcohol and at 5.76 and 8μ for the acetoxy group.

178 g. of 1-acetoxy-12-hexadecayne-10-ol were added to a cold mixture of 104 g. of p-toluenesulfonyl chloride in 70 g. of pyridine. At the conclusion of the reaction, the mixture was permitted to stand at 20° for several hours. Then ice water and ether were added and the ether solution was washed with dilute sulfuric acid, dilute sodium bicarbonate solution and water. After drying the ether solution over sodium sulfate and then distilling off the ether, 1-acetoxy-10-p-toluenesulfonyloxy-12-hexadecayne was obtained and used in the next step without additional purification.

200 g. of 1-acetoxy-10-p-toluenesulfonyloxy-12-hexadecayne were added slowly to a solution of 60 g. of potassium hydroxide in 180 ml. of water at 110° with vigorous stirring. After all of the compound had been added, the mixture was permitted to cool, then extracted with ether. The ether solution was washed with water, dried and concentrated. The crude 10-hexadecaen-12-yn-1-ol thus obtained was purified by distillation under high vacuum at 140–160°. It showed in the U.V. absorption spectrum a maximum at 228 mμ; active "H"=0.98.

In order to partially hydrogenate the product, 10 g. of the compound obtained above were agitated in 100 ml. of thiophene free benzene with 1 g. of a lead poisoned palladium catalyst at room temperature in a hydrogen atmosphere until one molar proportion of hydrogen was absorbed. The catalyst was filtered off and the benzene solution was washed with dilute sulfuric acid. After evaporation of the benzene, 10,12-monocis-hexadecadien-1-ol was obtained as a colorless oil; U.V. maximum at 233 mμ. The product showed in the I.R. spectrum the same bands as 10-cis,12-pentadecadien-1-ol.

Upon hydrogenation of the above product with platinum in alcohol and absorption of 2 molar proportions of hydrogen, there was obtained cetyl alcohol, M.P. 49°.

*Example 5*

A solution of 327 g. of ethyl bromide (3.0 mols) in 300 ml. of dry ether was added to a rapidly stirred suspension of 76.5 g. of magnesium (3.15 mols) in 500 ml. of dry ether at room temperature at a rate rapidly enough so that the reaction mixture heated to a slow rate of reflux. The solution was stirred for one additional hour and then decanted from the unreacted magnesium. Almost all of the ether was separated by distillation on a water bath until the temperature reached 46°. The residual syrup was cooled to 0° in a mixture of ice and water. Then 950 ml. of dry tetrahydrofuran were added carefully dropwise with stirring. A solution of 157 g. of 5-hexyn-1-ol in 80 ml. of dry tetrahydrofuran were added dropwise with stirring at 0° to the reaction mixture over a period of 2 hours whereupon a precipitate formed. The reaction mixture was briefly warmed to 40°, then cooled to 5° and 3.6 g. of cuprous chloride were added. After stirring for 15 minutes at room temperature, a solution of 189 g. of 1-bromo-2-octyne (1.0 mol) in 80 ml. of dry tetrahydrofuran was added dropwise over a period of 20 to 30 minutes. The solution was then boiled under reflux for 14 hours in a nitrogen atmosphere. An additional 1 g. of cuprous chloride was then added and the solution was heated to reflux for an additional 16 hours. The reaction solution was then concentrated under reduced pressure. The syrup obtained was added to a mixture of 1.5 liters of 2 N sulfuric acid and ice and the product was extracted three times with 400 ml. of ether. The combined ether extracts were washed once with 200 ml. of 2 N sodium carbonate solution and twice with 200 ml. of water, then dried over sodium sulfate under nitrogen. After removal of the ether, the residue was freed of low boiling constituents by heating in vacuo. Vacuum distillation then gave practically pure 5,8-tetradecadiyn-1-ol, B.P. 90–100°/0.1 mm.

A suspension of 1 g. of 5,8-tetradecadiyn-1-ol (0.0050 mol) and 0.5 g. of lead poisoned palladium catalyst in 110 ml. of high boiling petroleum ether and 2 ml. of a solution of quinoline in petroleum ether (5 ml. of quinoline in 95 ml. of high boiling petroleum ether) were hydrogenated at room temperature and atmospheric pressure. After absorption of the calculated proportion of hydrogen, the catalyst was separated by filtration and the filtrate was concentrated under water vacuum. The oily residue comprised practically pure 5,8-tetradecadien-1-ol and was used directly in the next step.

1. g. of 5,8-tetradecadien-1-ol, 1 g. of potassium hydroxide and 5 ml. of n-butanol were heated under reflux in a nitrogen atmosphere for 5 hours. The reaction mixture was then poured into 20 ml. of ice and water, taken up in low boiling petroleum ether, washed several times with water and dried over sodium sulfate. The petroleum ether was distilled off and the residue was subjected to high vacuum distillation whereupon there was obtained a mixture of 6-trans,8-cis-tetradecadien-1-ol and 5-cis, 7-trans-tetradecadien-1-ol; B.P. 96–99°/0.1 mm.; U.V. absorption maximum at 233 m$\mu$; $E_1^1$=1280; I.R. bands at 3.02, 6.07, 9.52, 10.22 and 10.60$\mu$.

*Example 6*

In a 10 liter, 4-neck flask equipped with stirrer, reflux condenser, thermometer and dropping funnel, 150 g. of ethyl bromide were added all at once to 382 g. of magnesium (15.7 mols) in one liter of dry tetrahydrofuran under nitrogen. As soon as the reaction commenced, 1.5 liters of dry tetrahydrofuran were added.

While cooling with a Dry Ice-acetone bath, an additional 1914 g. of ethyl bromide (total=19 mols) in 2.5 liters of dry tetrahydrofuran were added at a rate so that the temperature of the reaction mixture did not exceed 30°. Following the addition, the mixture was stirred for one more hour at 35°. Then it was cooled to −10° and 96 g. of 5-hexyn-1-oic acid (8 mols) in 400 ml. of dry tetrahydrofuran were added over a period of one hour, keeping the temperature of the mixture at about −10°. By heating at 40° for a short period, the reaction was brought to completion and the temperature of the reaction mixture was again reduced to 20°. Then 18 g. of cuprous chloride were added and after stirring for 15 minutes, 944 g. of 1-bromo-2-octyne (5 mols) were added dropwise to the reaction mixture over a period of 30 minutes. The mixture was boiled for 17 hours and, after intervals of 5 hours each, 5 g. portions of cuprous chloride were added twice (total=28 g.).

The cooled reaction mixture was poured into a mixture of 700 ml. of glacial acetic acid, 1 liter of water and 3 kg. of ice. This was extracted three times with 1 liter portions of ether. The ether solutions were combined and extracted three times with 1.5 liter portions of 2 N sodium carbonate solution. The sodium carbonate extracts were combined and extracted once with ether, then made acid to Congo red with 6 N hydrochloric acid. The oil which separated out was extracted three times with 700 ml. portions of ether and the combined ether extracts were washed with 500 ml. of water and dried over sodium sulfate. The ether was evaporated off and the oily residue was kept for 2 hours at −20°. Thereupon low melting crystals of 5,8-tetradecadiyn-1-oic acid precipitated.

A suspension of 22 g. of 5,8-tetradecadiyn-1-oic acid, 10 g. of lead poisoned palladium catalyst, 40 ml. of a 5% solution of quinoline (in high boiling petroleum ether) and 2 liters of high boiling petroleum ether were agitated with hydrogen at atmospheric pressure. After the absorption of the calculated molar proportion of hydrogen, the catalyst was filtered off and the filtrate was concentrated. The oily residue was distilled under high vacuum to obtain pure 5,8-tetradecadien-1-oic acid, B.P. 110–120°/0.05 mm.

20 g. of 5,8-tetradecadien-1-oic acid in 50 ml. of absolute ether were added to a solution of 3.5 g. of lithium aluminum hydride in 100 ml. at a rapid rate so that the reaction mixture heated up to slow reflux. The mixture was then heated for an additional hour at 35° and then treated with 3 N acetic acid with cooling until neutral. The thick emulsion which began forming was removed by filtering under suction through a filter aid. The aqueous portion was then separated and extracted portionwise with 100 ml. of ether. The combined extracts were washed with water until neutral. This was then dried over sodium sulfate, the ether was distilled off and the residue was distilled under high vacuum to obtain 5,8-tetradecadien-1-ol as a colorless oil, B.P. 100–107°/0.1 mm. The compound was isomerized in the same manner as in Example 1.

*Example 7*

25 g. of 10,13-hexadecadiyn-1-oic acid (obtained from ω-1-undecynoic acid and 1-bromo-2-pentyne by the same procedure as described in Example 6), 10 g. of lead poisoned palladium catalyst, 40 ml. of a 5% solution of quinoline in petroleum ether (60–70°) and one liter of petroleum ether were agitated under hydrogen. The absorption of hydrogen quickly reached 5 liters (740 mm., 25°). The catalyst was filtered off and the petroleum ether was distilled off from the filtrate (at the end under reduced pressure). 10,13-di-cis-hexadecadien-1-oic acid was obtained as a colorless oil, $n_D^{25}$=1.4675.

25 g. of 10,13-di-cis-hexadecadien-1-oic acid were reduced with 38 g. of lithium aluminum hydride by the procedure described in Example 6. After distillation under high vacuum, 10,13-di-cis-hexadecadien-1-ol was obtained as a colorless oil, B.P. 105–109°/0.1 mm.; $n_D^{25}$=1.4672.

20 g. of 10,13-di-cis-hexadecadien-1-ol were heated for 20 minutes at 150° with 20 g. of potassium hydroxide and 100 ml. of ethylene glycol under nitrogen. To work up the product, the reaction mixture was poured into 200 ml. of a mixture of ice and water, taken up in petroleum ether and washed with water until neutral. After drying and distilling off the petroleum ether, the residue was distilled under high vacuum, B.P. 108–113°/0.15 mm. There was obtained a mixture of 10-cis,12-trans-hexadecadien-1-ol and 11-trans,13-cis-hexadecadien-1-ol as a colorless oil; $n_D^{25}$=1.4790; U.V. absorption maximum at 233 m$\mu$; $E_1^1$=1200; I.R. bands at 3.03, 6.07, 9.53, 10.23 and 10.61$\mu$.

*Example 8*

25 g. of 9,12-hexadecadiyn-1-oic acid were hydrogenated in the presence of lead poisoned palladium catalyst in petroleum ether according to the procedure described in Example 6. There was thus obtained 9,12-di-cis-hexadecadien-1-oic acid as a colorless oil, $$n_D^{25}=1.4685$$

25 g. of 9,12-di-cis-hexadecadien-1-oic acid were reduced with 38 g. of lithium aluminum hydride by the same procedure as in Example 6 whereby 9,12-di-cis-hexadecadien-1-ol was obtained as a colorless oil, B.P. 101–105°/0.05 mm.; $n_D^{25}$=1.4680.

20 g. of 9,12-di-cis-hexadecadien-1-ol were dissolved in 20 ml. of ether and dropped into a solution of potassium amide in liquid ammonia. When all of the material had been dropped in, the reaction vessel was placed in an autoclave and agitated overnight at room temperature. Then after evaporating off the ammonia, the reaction mixture was carefully treated with saturated ammonium chloride solution, taken up in petroleum ether and washed until neutral. The petroleum ether was distilled off and the residue was fractionated to obtain a mixture of 9-cis,11-trans-hexadecadien-1-ol and 10-trans,12-cis-hexadecadien-1-ol as colorless oil, $$n_D^{25} = 1.4788$$

B.P. 112–116°/0.2 mm.; U.V. absorption maximum at 233 m$\mu$; $E_1^1 = 1,230$.

We claim:
1. An insecticidal composition which comprises an insect lure selected from the group consisting of unbranched, unsubstituted aliphatic monohydroxy alcohols with the hydroxy group on a terminal carbon atom and containing 14 to 18 carbon atoms and two double bonds in the chain and lower alkanoyl esters of said alcohols, an insecticide and an inert diluent therefor.

2. A composition as in claim 1 wherein the proportion of insect lure to insecticide is within the range 1:5 to 1:10,000.

References Cited in the file of this patent
UNITED STATES PATENTS

| | | |
|---|---|---|
| 2,136,178 | Carothers | Nov. 8, 1938 |
| 2,155,949 | Bode | Apr. 25, 1939 |
| 2,263,827 | Siegler | Nov. 25, 1941 |
| 2,394,848 | Doumani | Feb. 12, 1946 |
| 2,413,803 | Tribit | Jan. 7, 1947 |
| 2,420,568 | Sennewald | May 13, 1947 |
| 2,811,479 | Geary | Oct. 29, 1957 |

OTHER REFERENCES

Leeuwen: Jour. Eco. Ent., vol. 36, pages 430–433, June 1943.